United States Patent

[11] 3,618,835

| [72] | Inventors | Edwin C. Terry;<br>Robert C. Terry, both of Ursa, Ill. 62376 |
|---|---|---|
| [21] | Appl. No. | 843,048 |
| [22] | Filed | July 18, 1969 |
| [45] | Patented | Nov. 9, 1971 |

[54] TRUCK BUMPER, TRAILER HITCH AND QUICK ACCESS TIRE CARRIER
8 Claims, 6 Drawing Figs.

[52] U.S. Cl. ............................................. 224/42.06,
224/42.23, 293/69, 293/73
[51] Int. Cl. ........................................... B62d 43/00,
B61f 19/04
[50] Field of Search ............................. 224/42.03,
42.05, 42.06, 42.23; 293/73, 69, 55; 296/57, 76;
214/451–454

[56] References Cited
UNITED STATES PATENTS

| 2,575,211 | 11/1951 | Flacke | 296/76 X |
| 3,398,846 | 8/1968 | Ragan et al. | 214/454 |
| 3,533,654 | 10/1970 | Kannegieter | 293/73 |
| 1,447,387 | 3/1923 | Heil et al. | 293/73 X |
| 1,513,991 | 11/1924 | Homan et al. | 293/73 X |
| 1,761,920 | 6/1930 | Hunt et al. | 224/42.23 |
| 2,603,527 | 7/1952 | Perkins | 224/42.05 X |

*Primary Examiner*—Robert G. Sheridan
*Assistant Examiner*—John Mannix
*Attorney*—Berman, Davidson and Berman ABSTRACT: A bumper for a vehicle adapted to have a trailer hitch device connected thereto and said bumper being swingable from a vertical plane to a horizontal plane to permit a vehicle to back up to a dock and to permit easy access to a tire carrier, the structure including bracket means connected to the chassis of the vehicle, other bracket means pivotally connected to said first-mentioned bracket means with bumper means rigidly secured to said other bracket means, and latch means operatively connected to linkage means secured to the bumper for latching the bumper in a vertical plane to said first mentioned bracket means at one time and for releasing said bumper so it can be swung to a horizontal lower plane at another time, said bumper means being positioned in a plane below a tire carrier bracket when in its lower position to provide quick access to a tire adapted to be carried by said tire carrier.

INVENTORS
ROBERT C. TERRY,
EDWIN C. TERRY,
BY Berman, Davidson & Berman,
ATTORNEYS.

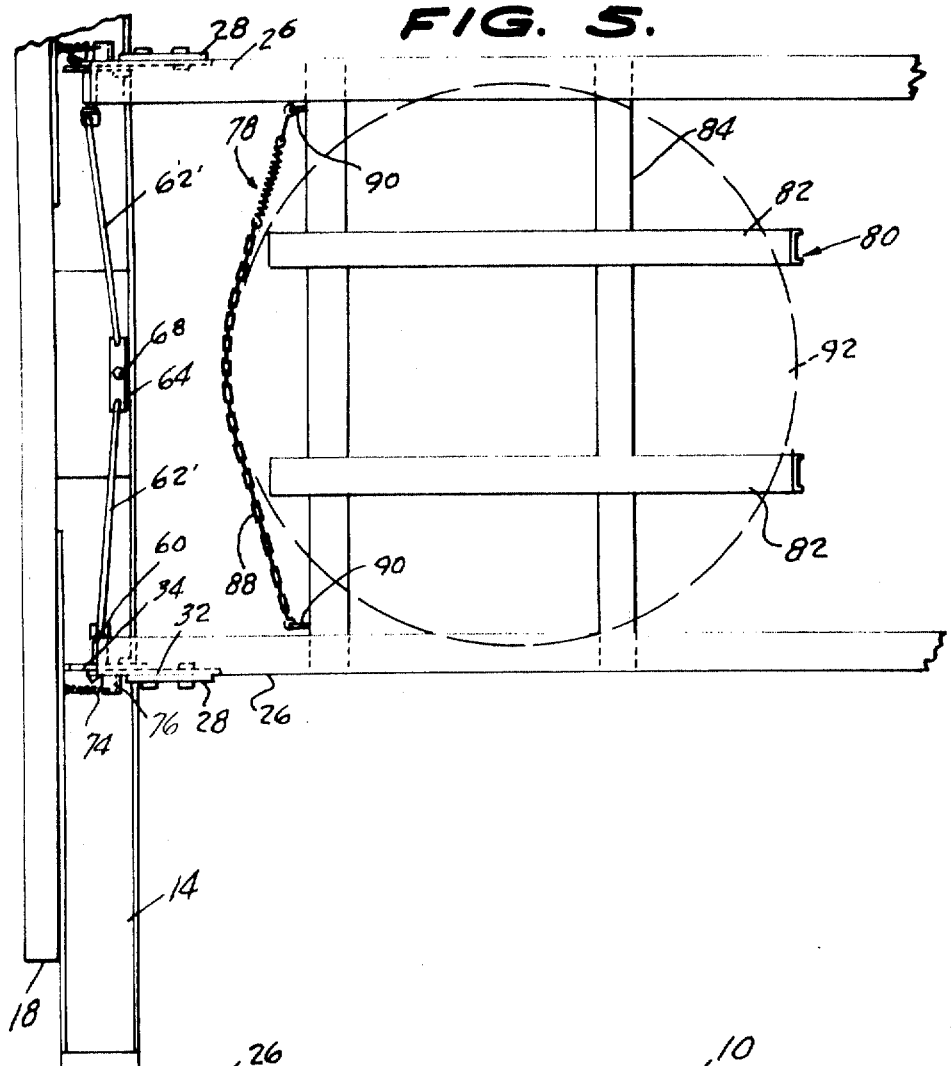
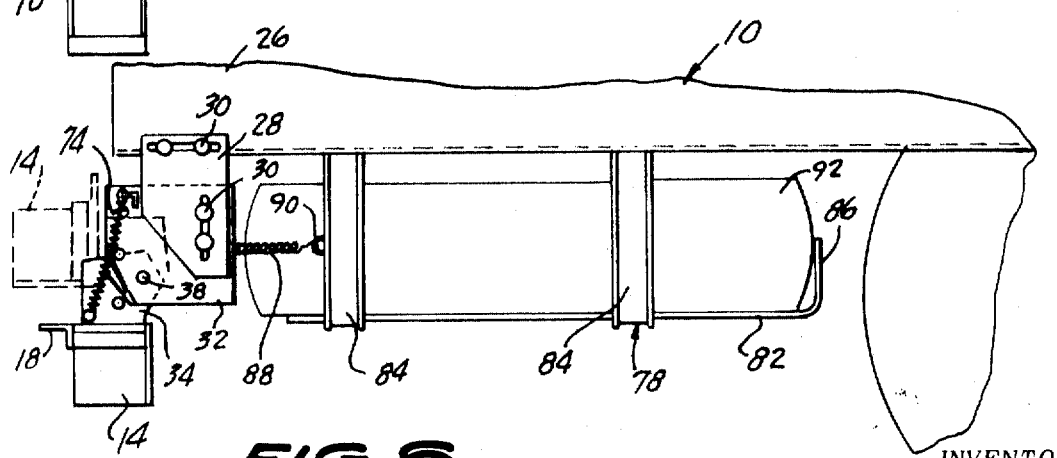

TRUCK BUMPER, TRAILER HITCH AND QUICK ACCESS TIRE CARRIER

The present invention relates to a vehicle and more particularly to a vehicle which is provided with a bumper assembly which in constructed so that it can be readily swung or moved out of the way so that the vehicle, such as a pickup truck, can be backed up to a chute or dock.

It is another object of the present invention to provide a bumper assembly for a conventional pickup truck and the like that can be swung downwardly and out of the way below its normal position so that it will not interfere with the tailgate of the vehicle.

Another object of the present invention is to provide a bumper assembly and a quick access tire carrier assembly in which the bumper can be released to fall from its usual operating position to a downward position so that the bumper will not interfere with access to the tire carried in the tire carrier.

It is yet another object of the present invention to provide a novel bumper assembly and trailer hitch and tire carrier device that can be readily and inexpensively made and can be installed in pickup trucks and the like now in the field.

Various other objects and advantages of the present invention will be readily apparent from the following detailed description when considered in connection with the accompanying drawings forming a part thereof, and in which FIG. 1 is a perspective view of the bumper assembly embodied in the present invention, shown attached to a pickup truck.

FIG. 5 is a top plan view of the bumper assembly when it is positioned in a downward position, and FIG. 6 is a view similar to FIG. 5 but illustrating a side view of the bumper assembly and the tire carrier when the bumper is disposed in a downward position.

Figure 2:
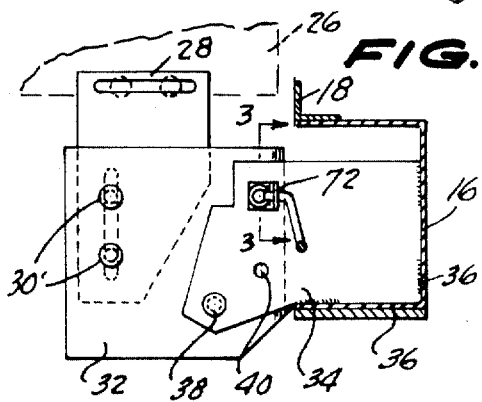
FIG. 2 is an enlarged view of detailed section taken along the lines 2—2 of FIG. 1.

Referring to the drawings, the reference numeral 10 generally designates a pickup truck having a tailgate 12 and a bumper assembly 14. The bumper assembly is provided with a bumper 16 of substantially U-shaped configuration, as best seen in FIG. 2, with an angle iron member 18 secured to the top thereof. The bumper extends substantially across the full width of the rear 20 of the pickup truck and has end portions 22 that extend beyond the fender portion 24 so as to fully protect the vehicle from damage.

Figure 3:
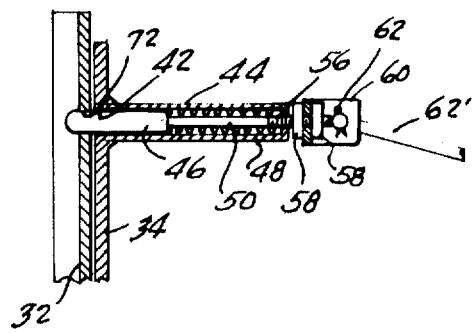
FIG. 3 is a section taken along the lines 3—3 of FIG. 2.

The chassis 26 of the vehicle is provided with vertical plates or bracket member 28 bolted thereto at 30 and depending downwardly below the lower edge of the chassis. The vertical bracket members 28 have secured thereto substantially square plates or bracket members 32 by bolt members 30¹. The bracket members 32 extend rearwardly of the vertical bracket member 28, as best seen in FIGS. 2 and 6. Pivotally connected to the bracket members 32 adjacent the rear portion thereof are two vertical plate members or bracket members 34 to which the bumper 16 is welded as indicated at 36 in FIG. 2. The vertical plates 34 are pinned to the plates 32 by the pins 38 extending through the lower forward end of the plate 34 and the rear lower end of the plate 32. The plates 34 are provided with another aperture 40 and an opening 42 in the upper end thereof through which is secured a sleeve 44, as best seen in FIG. 3. The sleeve 44 is provided with a plunger 46 and has a biasing spring 48 mounted on the reduced section 50 of the plunger. The spring 48 bears against an in-turned rim 56 on the outer end of the sleeve and against the enlarged lower section of the plunger 46. Nuts 58 secure the sleeve 44 to an L-shaped bracket 60. The L-shaped bracket 60, in turn, is connected by a cotter pin 62 to the end of a linkage member 62¹. The linkage members 62¹ have their inner ends connected to a small rectangular plate 64 that is fixed to a lever or handle 66 which is journaled as indicated at 68 in the central recessed portion 70 of the bumper.

The vertical plates or brackets 32 are provided with round openings 72 therein and the ends of the plungers 46 are normally maintained in these round openings 72 by the force of the biasing spring 48 so that the bumper is maintained in an upright position, as shown in FIG. 2.

Figure 1:
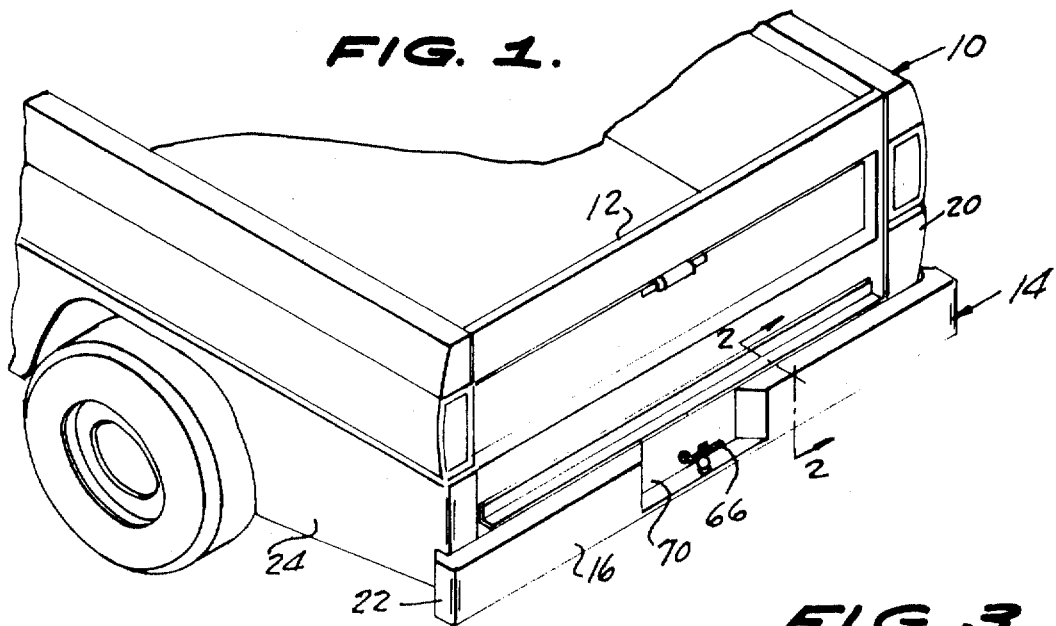
Figure 4:
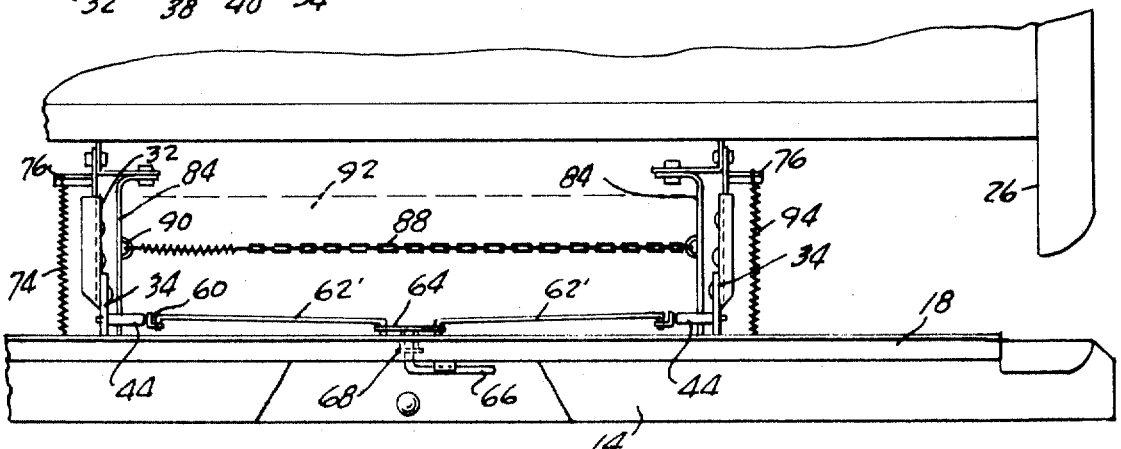
FIG. 4 is view of the bumper assembly shown in FIG. 1 when it has been swung to a downward position.

When it is desired to let the bumper swing to its downward position, or to the position shown in FIGS. 4 and 5, it is only necessary to lift the lever 66 so as to turn the plate 64 and the linkage members 62¹ to pull the plungers 46 out of the round openings 72 in the plates 60 and the bumper 14 can be readily turned or let downwardly to its lowermost position so as to permit the tailgate 12 to be readily turned to its downward position or so that the truck can be backed into a dock or bay for loading or unloading as desired. The bumper 14 is also provided with two spring members 74 connected to brackets 76 on the upper ends of the plates 32 so that the bumpers can be easily raised to their uppermost position, as shown in FIG. 1, when desired.

Disposed below the chassis 26 is a tire carrier 78 formed of a latticework or frame 80 comprising horizontal straps 82 and vertical straps 84 secured to each other and to the chassis.

The front ends of the straps 82 are provided with upstanding ends 86 and a spring chain 88 has its opposite ends secured to eyes 90 on the straps 84 so as to keep the tire 92 in a position where it will not bounce out or become dislodged.

When the handle 66 is lifted and the bumper 16 is pivoted or swung downwardly to the position shown in FIG. 4 or 6, it is apparent that the tire 92 can readily be removed from its carrier by releasing one end of the spring chain member 88 from its eye 90, and the tire can be quickly pulled out for replacement of a punctured tire as desired.

Thus, from the foregoing description it is apparent that the present invention provides a novel combination of a bumper assembly that can be swung down out of the way of the tailgate of the vehicle and latch means for maintaining the bumper in its normal upright position and which bumper assembly can give quick access to the tire carrier disposed below the chassis, and which bumper can readily be utilized with a trailer hitch.

Inasmuch as changes may be made in the form, location and relative arrangement of several parts without departing from the essential characteristics of the invention, it is to be understood that this invention is not to be limited except by the scope of the appended claims.

What is claimed is:

1. A bumper assembly comprising first bracket means for securing a bumper to the chassis of a vehicle, second bracket means hingedly connected to said first bracket means and swingable from a raised position to a lowered position, a bumper rigidly secured to said second bracket means to swing from a raised to a lowered position, said bumper having a recessed portion in its outer face, latch means normally connecting said bracket means together so said second bracket means and said bumper are in their raised positions, a handle journaled in said bumper, said handle being operatively connected to said latch means inwardly of said bumper and extending into said recessed portion of said bumper for releasing said latch means to permit said second bracket means and said bumper to swing to their lowered positions, and a tire carrier secured to said first bracket means and having an access opening therein disposed adjacent the level of said bumper when in its raised position.

2. The assembly of claim 1 wherein said first and second bracket means are provided with horizontal pin means connecting them together and have aligned openings with a plunger disposed therein to prevent said second bracket means from movement to its lowered position.

3. The assembly of claim 2 wherein said second bracket means has a sleeve and said plunger is disposed therein, and biasing means in said sleeve forces said plunger into said opening in said first bracket means.

4. The assembly of claim 1 wherein said tire carrier comprises a lattice framework depending from said first bracket means.

5. The assembly of claim 4 wherein said latticework is provided with upturned ends adjacent its front to prevent a tire from coming out of it, and a spring chain adjacent its access opening and in front of said bumper when in its raised position.

6. The assembly of claim 1 wherein a ball-type trailer hitch is secured to said bumper.

7. The assembly of claim 1 wherein spaced spring means are secured to said bumper and said first bracket means.

8. The assembly of claim 3 wherein a linkage member is operatively connected between said plunger and said handle for pulling said plunger out of the opening in said first bracket means responsive to a turning of said handle to permit said bumper to swing to its lowered position.

* * * * *